May 16, 1933.　　　V. B. KLEFBECK　　　1,909,544
ADVERTISING DEVICE
Filed May 13, 1931　　　5 Sheets-Sheet 1
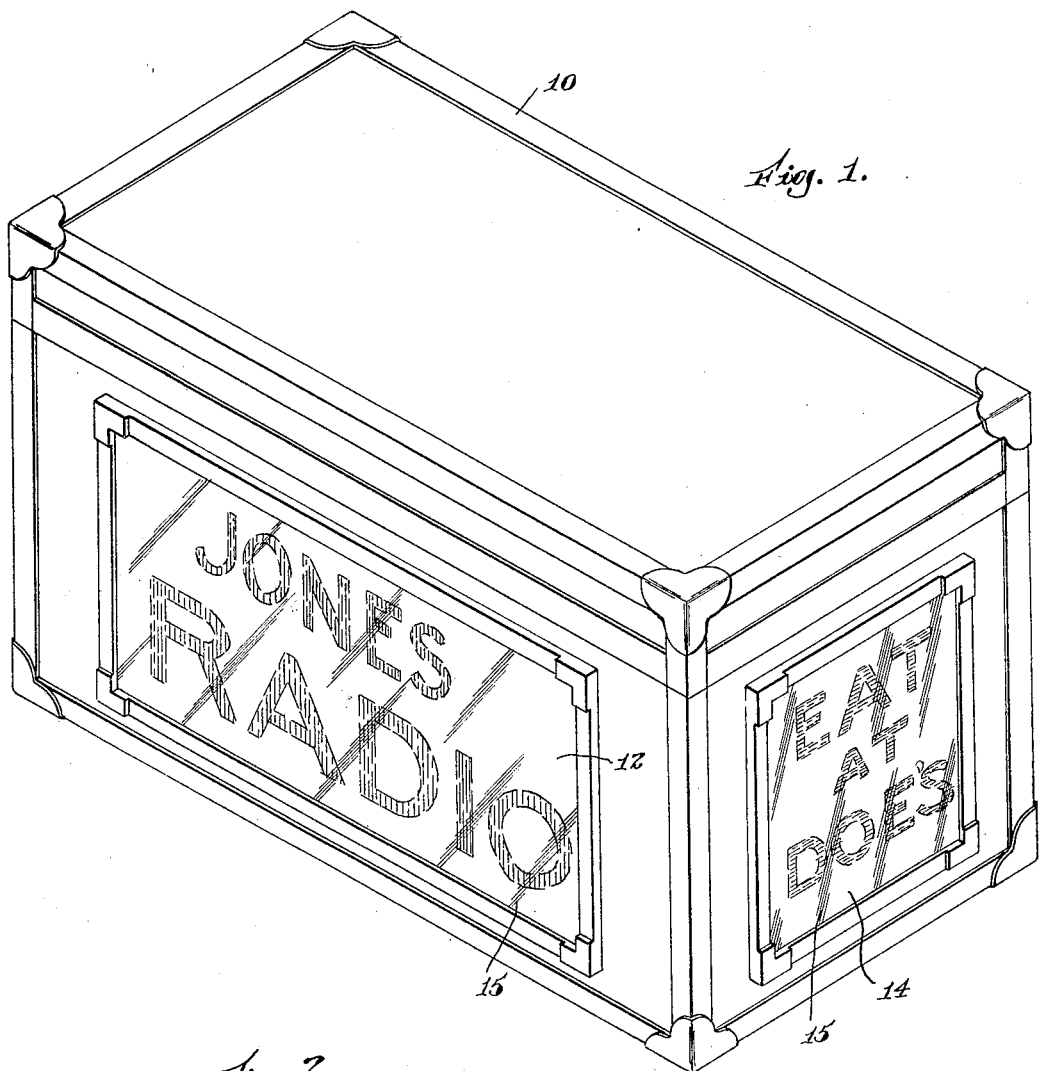
Fig. 1.
Fig. 2.
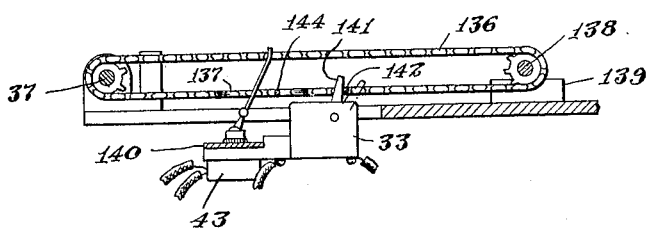
Inventor
Victor B. Klefbeck
by Kenway + Witter
Attorneys

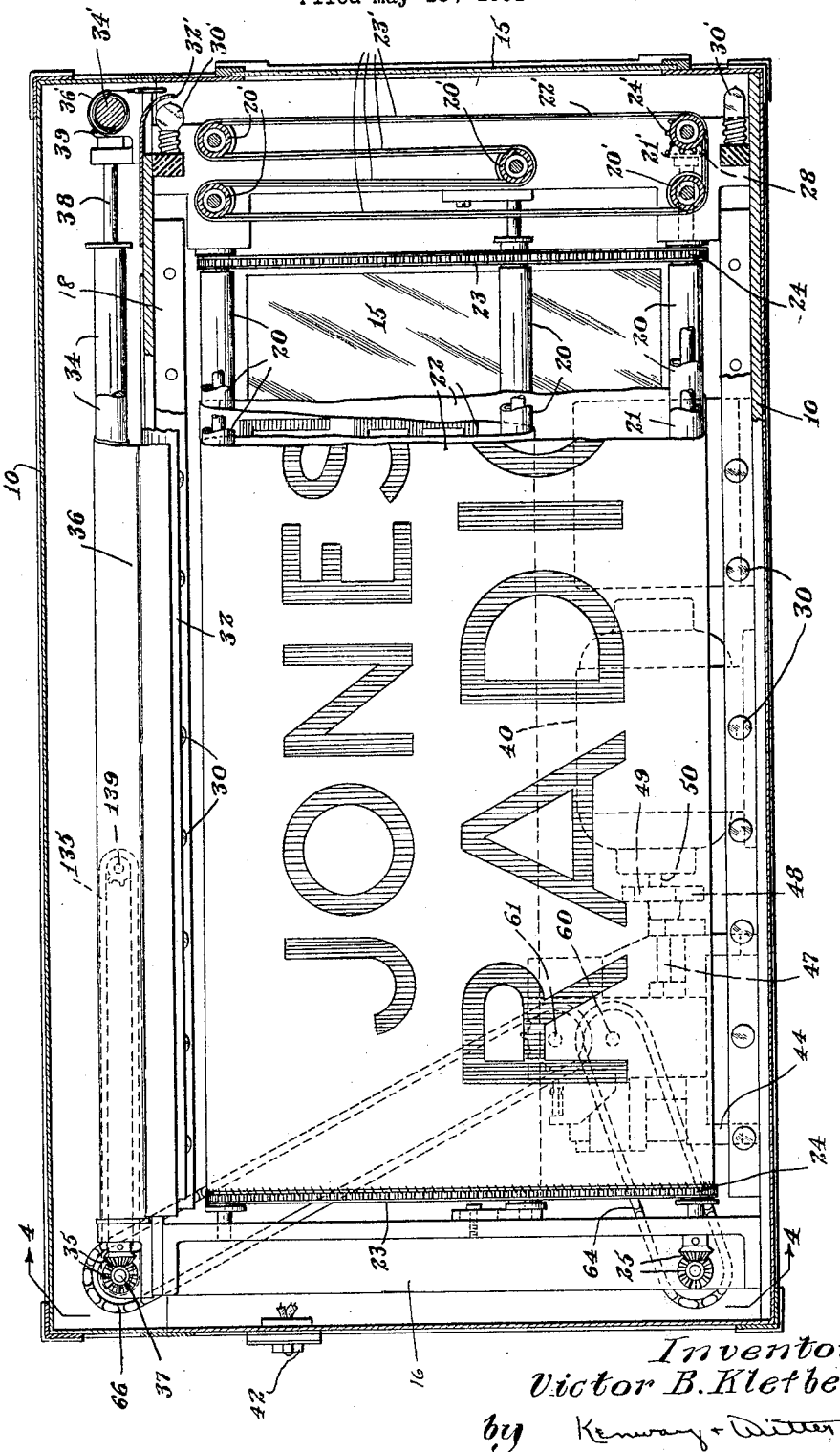

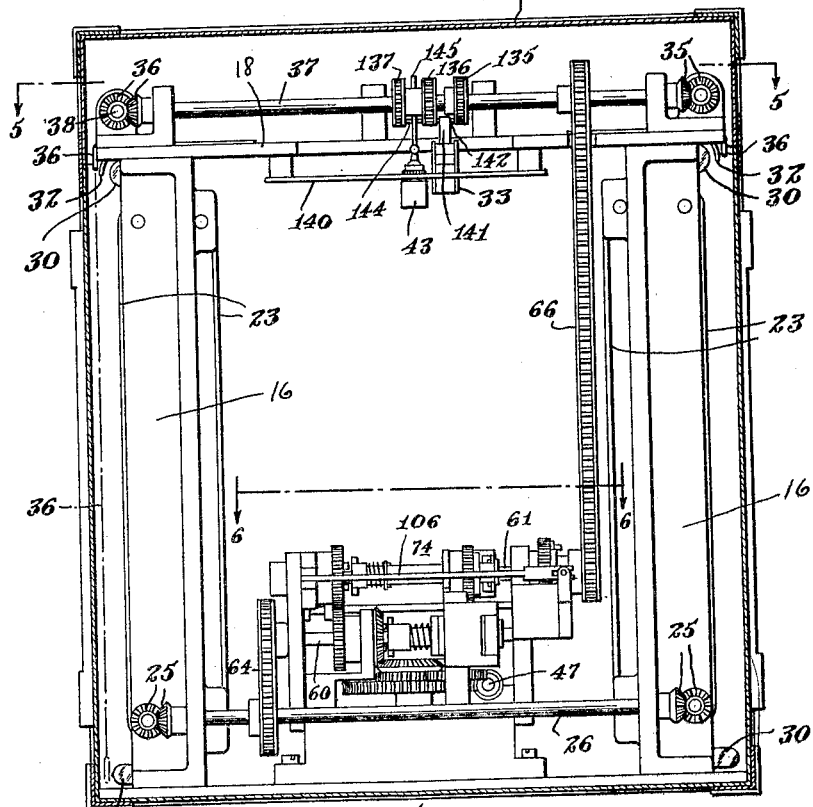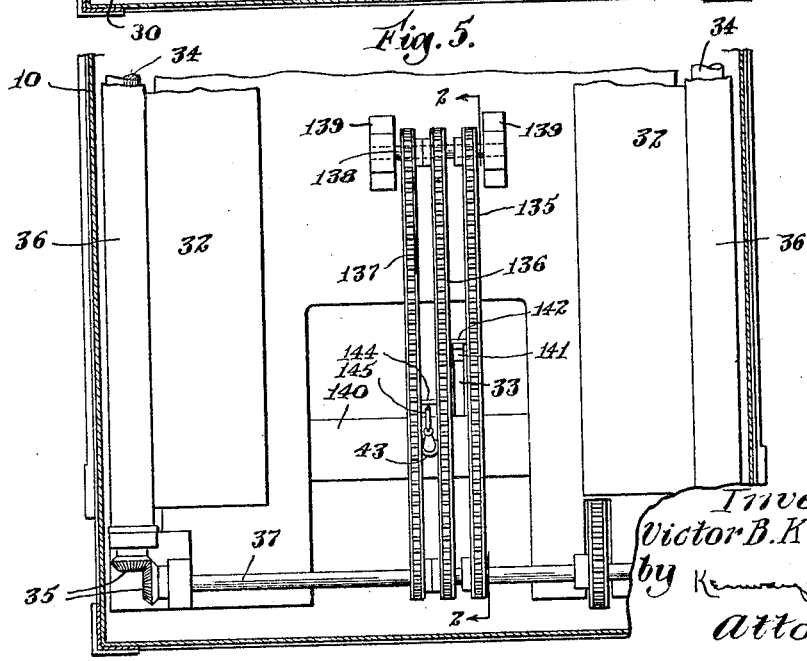

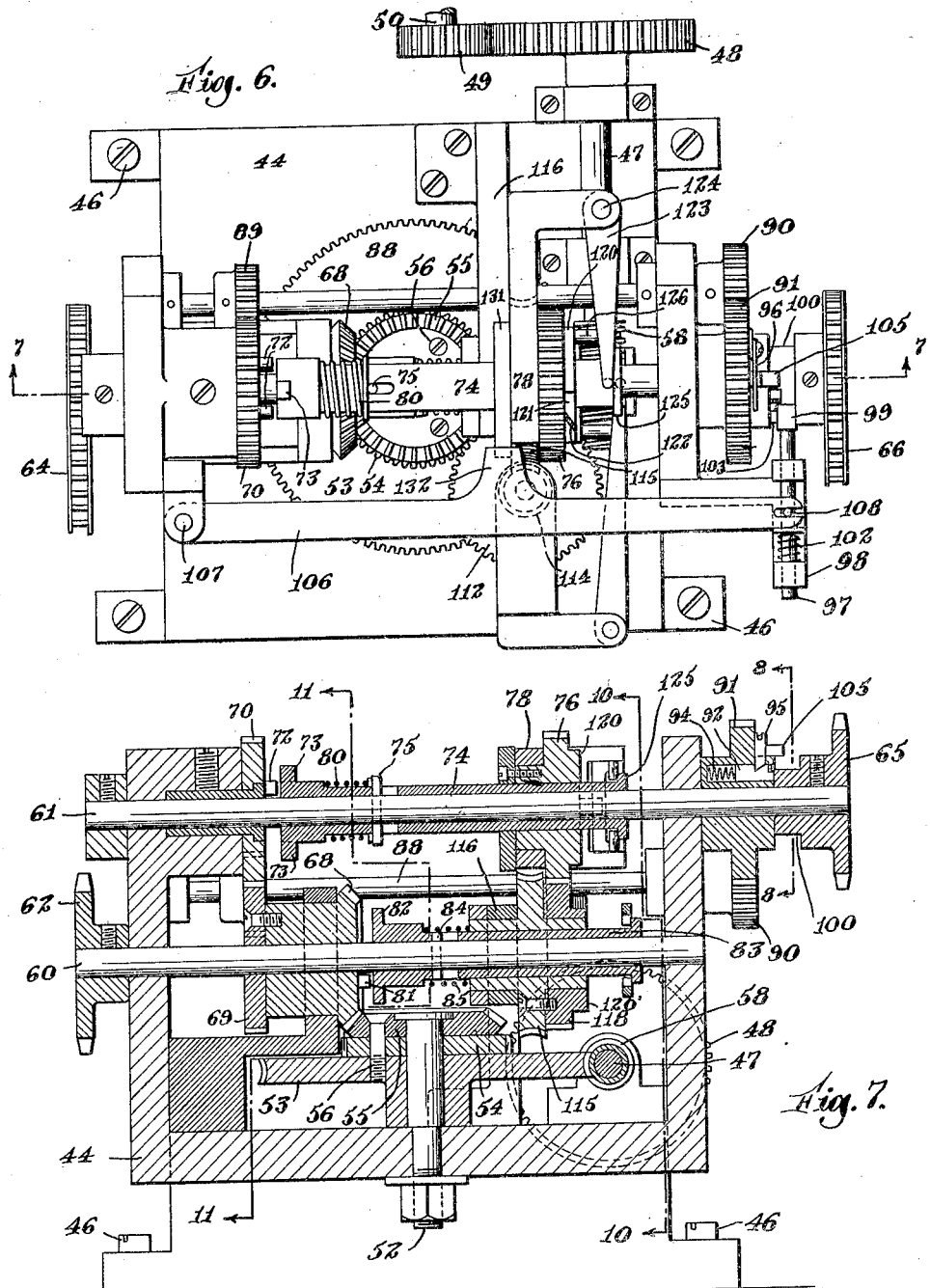

Inventor
Victor B. Klefbeck
by Kenway + Witter
Attorneys

Patented May 16, 1933

1,909,544

UNITED STATES PATENT OFFICE

VICTOR B. KLEFBECK, OF NEW BOSTON, NEW HAMPSHIRE

ADVERTISING DEVICE

Application filed May 13, 1931. Serial No. 536,961.

This invention relates to advertising devices, and more especially to such devices wherein the advertising exhibits change at periodic intervals. It is well known that moving objects attract much more readily than do stationary objects and in like manner an advertisement which changes or shifts periodically attracts a relatively larger audience. I am aware that advertising devices of this general nature are well known and in quite common use but I furthermore believe that as thus known and used these devices have certain objections which lessen their effectiveness for the purpose intended. One of these objections is that such devices are constructed to continuously expose and illuminate the advertising exhibits even when the exhibits are in process of being changed, the effective impression of the advertisement on the audience being thereby quite forgotten and absorbed by the changing movements of the exhibits. It is an object of my invention to provide an advertising device of this nature wherein the exhibits, when in their stationary exhibiting positions, are exposed to the view of the public by illumination of the exhibits or otherwise but which are hidden from such view during the process of changing from one exhibit to another exhibit.

The above object may be accomplished in illuminated night advertisement of an advertisement located in a relatively dark place by illuminating the exhibit during its stationary period and discontinuing the illumination during the period of changing from one exhibit to another, and it may be accomplished in a daylight advertisement by providing a means for covering and shielding the advertisement, space or station from view during the exhibit-changing process but permitting full view of the exhibit during the period of time between such changing operations. It is a further object of my invention to provide an advertising device embodying either or both of these novel features.

My invention in a more specific aspect comprises a device of the above nature wherein a plurality of exhibits are carried on and spaced along the length of a relatively long and preferably endless sheet or belt extending about a plurality of rolls. Mechanism is provided for moving the sheet intermittently at periodic intervals whereby to bring its exhibits successively into an exposed position at an exhibiting station. Cooperating with the station is a flexible curtain adapted to be moved to positions covering and exposing the exhibiting station by mechanism synchronized with the belt moving means, the arrangement being such that the station is covered or hidden while change of exhibits is taking place and is fully exposed during the intervening period of time and while the exhibit is in stationary position thereover. The mechanism furthermore preferably embodies means for illuminating the exhibit and cooperating and synchronized mechanism for discontinuing the illumination during the exhibit-changing operations. The production of an apparatus embodying these novel features comprises a further object of my invention.

An advertising device of the above-defined nature may be stationary or movable and may comprise a single exhibiting station or a plurality of stations located relatively adjacent to each other, as for example, when three such stations are located on the two sides and rear of a vehicle. Another object of my invention is the production of such a plural station advertising device and means common to all the stations for performing any or all of the functions above defined.

With the above and other objects in view, as will hereinafter more clearly appear as this description proceeds, my invention consists in the features of construction and operation set forth in the following specification and illustrated in the accompanying drawings. In such drawings I have illustrated certain specific embodiments of the invention but it will be understood that the invention can be otherwise embodied and that the drawings are not to be construed as defining or limiting the scope of the invention, the claims appended hereto being relied upon for that purpose.

Referring to the figures of the drawings,

Fig. 1 is a perspective view of a body containing my improved advertising device;

Fig. 2 is a fragmentary detail view taken approximately on line 2—2 of Fig. 5;

Fig. 3 is a side elevation, partially broken away, of the body shown in Fig. 1;

Fig. 4 is a sectional view through the body on line 4—4 of Fig. 3;

Fig. 5 is a fragmentary plan view taken on line 5—5 of Fig. 4;

Fig. 6 is a plan view of the operating mechanism taken on line 6—6 of Fig. 4;

Fig. 7 is a sectional view taken on line 7—7 of Fig. 6;

Figure 8:
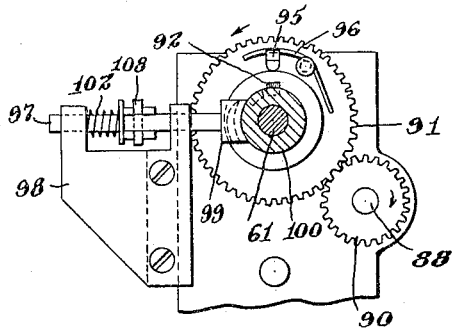
Fig. 8 is a sectional detail view taken on line 8—8 of Fig. 7.

As has been heretofore stated, my invention relates to advertising devices of the type wherein a plurality of exhibits are caused successively and periodically to be brought into exhibiting position at or over a relatively fixed exhibiting station. The device may comprise a relatively large out-of-door advertisement, a relatively small indoors advertisement, or an advertisement of any desired size or style therebetween. The device may furthermore comprise a plurality of exhibiting stations spaced from each other and arranged in any desired relative manner and cooperating mechanism common to all the stations for causing the exhibits and the elements cooperating therewith to function in the proper synchronized manner whereby to accomplish the objects of the invention at all said stations. The invention may also be utilized as a traveling advertisement by mounting the device on an automobile truck or other vehicle and in this case there will preferably be three exhibiting stations respectively at the two sides and rear of the vehicle. It is believed that this last method illustrates the use of my invention very satisfactorily and I have, therefore, in the accompanying drawings shown the device as used in this manner.

Referring more specifically to the drawings by reference characters, 10 indicates a rectangular body member which may be mounted on a vehicle, the member having an exhibiting station 12 at each side thereof and a third exhibiting station 14 at the rear, it being understood that transparent windows 15 may be provided at these stations. Within the body member and adjacent to each station is a relatively wide and endless belt or sheet carrying a plurality of advertising exhibits for exposing successively at its station. Also within the body is a mechanism common to all the stations for causing intermittent movement of the belts whereby successively to change the exhibits at the stations. Means are provided for illuminating the exhibits at the stations; curtains are provided for shielding the stations from view during the exhibit-changing operations; and means common to all the stations and synchronized with the exhibit-changing operations is provided for causing the stations to be illuminated and exposed to view only when exhibits are placed and held stationary thereon for exhibiting purposes. I will now proceed to define this specific mechanism as illustrated in the accompanying drawings.

Within the body 10 and just rearwardly of the window 15 of each of the stations 12 and 14 is an exhibit-carrying mechanism, these mechanisms being carried on corner posts 16 connected together by plates 18. Since the two side mechanisms are identical and the rear mechanism is substantially the same except that it is narrower, a single description thereof will suffice, corresponding parts in the rear mechanism being indicated by like reference characters primed. At each station are four idler rolls 20 and a driven roll 21, all carrying a relatively wide and endless belt or sheet 22 looped thereover, one portion of the belt being held in taut position directly to the rear of its exhibiting window 15. The belts may be constructed of any suitable material, preferably of a fabric nature, and two of the side edges thereof are secured to endless elongated metal belts or chains 23 for engaging over the teeth of sprockets 24 on the driving rolls 21. The rolls 21 are driven through bevel gears 25 from a transverse shaft 26 on the forward end of the body and the roll 21' is driven from the shaft of one of the rolls 21 through bevel gears 28.

The edge portions of each station may be provided with a plurality of electric lights 30 so arranged in conjunction with reflectors 32 as to illuminate the exhibit on the sheet 22 at the rear of the window 15. While I have illustrated such lights as arranged along the bottom and top edges of the stations, it will be understood that they may also be likewise arranged at the side edges if desired. These lights are controlled automatically from a switch 33, which switch is normally in the open position shown in broken lines in Fig. 2. The functions and operation of these lights in synchronism with the device is hereinafter described.

As has been above defined, the belts 22 and 22' are periodically operated to shift the advertising to the next adjacent exhibit on each belt, such exhibit then being permitted to remain in exposed position above the window 15 for a predetermined time period. I have herein illustrated the following described shielding curtains as one possible means for hiding the exhibit stations from view while the belts are operating to change the exhibits, the purpose of this action being to eliminate distraction from the advertised features. Extending along and over the top of each frame 16 is a roll 34 and a curtain 36 is so hung from each of these rolls that unwinding of the roll causes the curtain to drop to the position shown in broken lines in Fig. 4. The rolls 34 are driven through bevel gears 35 from a transverse shaft 37 on the forward end of the body 10 and the roll 34' is driven from the shaft 38 of one of the rolls 34 through bevel gears 39. The automatic operation of these curtains in synchronism with the cooperating mechanism is hereinafter described.

The mechanism heretofore briefly described may be operated by an electric motor 40 mounted within the body 10. This motor and the lights 30 may both be under the control of a conveniently located hand switch 42, the lights being also controlled automatically by the switch 33 and the motor by a switch 43 which is normally in the closed position shown in Fig. 2. The mechanism which is driven by the motor, and through which the several operating parts are controlled to perform their functions in synchronism and automatically, is mounted on a base 44 which is rigidly secured to the bottom of the body 10 by screws 46. The main driving shaft 47 of this mechanism carries a gear 48 with which meshes a pinion 49 on the motor shaft 50, the shaft 47 being thereby driven from the motor.

Mounted to rotate on a vertical stud 52 carried by the base 44 are three gears 53, 54 and 55 secured together by screws 56. These gears are rotated from the main driving shaft 47 by means of a worm 58 on that shaft in mesh with the worm gear 53. During the time that the device is in operation these gears are continuously rotated by the motor. Two shafts 60 and 61 are mounted in the upright side portions of the base piece 54, and these shafts are adapted respectively to drive the exhibit-changing shaft 26 and the curtain-operating shaft 37, as hereinafter described. The shaft 60 is connected to its shaft 26 through sprockets 62 and sprocket chain 64, and the shaft 61 is connected to its shaft 37 through sprockets 65 and sprocket chain 66.

The shafts 60 and 61 are driven from the bevel gear 55 which is in mesh with a bevel gear 68 loose on the shaft 60. A spur gear 69 secured to the gear 68 is in mesh with a like spur gear 70 loose on the shaft 61. Extending outwardly from the free face of the gear 70 are two pins 72 and adapted to cooperate therewith are two projections 73 extending radially outward from a relatively long sleeve 74 pinned at 75 to the shaft 61. This sleeve is supported in a gear 76 which is rotatably mounted within a bearing 78. The pin 75 is carried by the shaft 61 and the sleeve 74 is slotted to permit sufficient longitudinal movement of the sleeve under the action of a spring 80 therearound to provide a driving connection between the pins 72 and the projections 73, whereby to rotate the shaft 61, sprocket 65 and shaft 37. The shaft 60, sprocket 62 and shaft 26 are driven in like manner through a similar sleeve clutch mechanism comprising a pair of pins 81 on the gear 68 cooperating with two projections 82 on a sleeve 83 slidable on the shaft 60, the sleeve and shaft being pinned together at 84 and a spring 85 normally engaging the sleeve with the gear 68.

It will be obvious that whereas the sprocket 62 need be rotated only in a single direction to move the belts 22 forwardly at each cycle of operation, the sprocket 65 is required to be operated first in one direction to drop the curtains 36 and thereafter in the opposite direction to raise the curtains. The sprocket 65 is rotated in the direction to raise the curtains through the clutch 74 by its engagement with the gear 70 and rotation of the shaft 61 and sprocket 65 in the opposite direction to drop the curtains is secured through a countershaft 88. One end of this shaft carries a pinion 89 in mesh with the gear 69 and a pinion 90 on the other end of the shaft is in mesh with a gear 91 loose on the shaft 61 and directly adjacent to the hub of the sprocket 65. A clutch connection between the gear 91 and the sprocket 65 for rotating the latter at the proper time is provided as follows.

Figure 9:
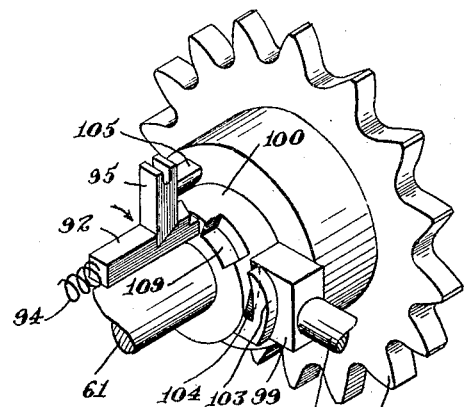
Fig. 9 is a perspective and illustrative view of cooperating details shown in Figs. 6, 7 and 8.

A bolt 92 is slidably mounted in the hub of the gear 91 and is normally forced outwardly toward the hub of sprocket 65 by a spring 94. A detent 95 carried by the gear 91 is normally forced by a spring 96 into a notch in the bolt whereby to hold the bolt retracted, as shown in Figs. 7 and 9. A rod 97 slidably mounted in bearings 98 has a head 99 which is normally held engaged against a reduced hub portion 100 of the sprocket 65 by a spring 102. This head has a projecting portion adjacent to the gear 91 providing a peripheral cam surface 103 and a face cam surface 104 directed toward the gear 91. When the head 99 is engaged against the hub portion 100, a pin 105 on the detent 95 is adapted to ride freely over the cam surface 103. However, when the head is moved outwardly by a slight pivotal movement of a lever 106 having one end pivoted at 107 and its other end connected by a pin and slot 108 to the rod 97, the pin 105 rides upon the cam surface 103 and withdraws the detent. The spring 94 thereupon thrusts the bolt 92 forwardly to engage within a notch 109 in the hub portion 100, thereby locking the sprocket 65 and gear 91 together and causing the sprocket to be rotated in a direction opposite to that caused by the clutch 74. When the head 99 is again engaged with the hub portion 100, its cam surface 104 is engaged by the end of the bolt 92, whereby the bolt is forced inwardly to its latched position. The lever 106 is automatically operated, as hereinafter described, to cause this driving connection at the proper time.

The means for controlling the automatically the clutches 74 and 83 and the lever 106 is driven from the gear 54 and this mechanism will now be described, it being understood that these controlling operations are performed in such sequential order as to cause the advertising device to go through its cycle of operations automatically. Meshing with the gear 54 is a gear 112 and on the same shaft with gear 112 is a worm 114 in mesh with a worm wheel 115. This worm wheel has tubular hub portions extending from opposite sides thereof and the sleeve 83 is supported within these portions. One hub portion is rotatably supported within a bearing 116 and secured to the worm wheel on its other hub portion is a spur gear 118, this gear 118 being in mesh with the gear 76. It will, therefore, be seen that the gears 118 and 76 are driven in opposite directions at a relatively slow rate from the gear 54.

The gear 76 has an outwardly-projecting portion 120 on one face thereof and this portion is cut away to provide a recess 121 and a cam surface 122. A plate 123 pivoted at 124 has its free end bifurcated and engaging against an annular shoulder 125 on one end of the sleeve 74 and a stud 126 carried by the plate is adapted to ride against the gear portion 120 in the path of movement of the recess 121. The spring 80 normally forces the sleeve to the left (Figs. 6 and 7) and when the recess 121 reaches the stud 126 the stud falls thereinto, thereby clutching the shaft 61 to the gear 70 and driving the sprocket 65. The cam surface 122 thereafter forces the stud outwardly and disconnects the clutch, the recess being just sufficiently long to give the sprocket the proper amount of rotation. The clutch sleeve 83 is operated by an identical mechanism in conjunction with the gear 118 and the parts thereof which correspond to the parts above described are in the drawings indicated by the same reference characters primed. The lever 106 is operated by a cam projection 130 on the periphery of a plate 131 secured to the gear 76, this cam being adapted to act against a laterally-projecting portion 132 of the lever.

The light switch 33 and safety switch 43 are operated from the shaft 37 as follows. Three endless chains 135, 136 and 137 extend over and are carried by sprockets on the shaft 37 and like sprockets on a shaft 138 supported in bearings 139. The switches 33 and 43 are supported on a platform 140 below these chains and the operating arm 141 of the switch 33 extends upwardly between the lower reaches of the chains 135 and 136. This switch is normally in the open position shown in broken lines in Fig. 2 and is adapted to be moved to and held in the closed position shown in full lines by a bar 142 having its ends connected to the chains 135 and 136. When the chains are in the position of Fig. 2, the lights are on, the belts 22 are stationary and the exhibits thereon are being shown through their windows 15. A bar 144 has its ends connected to the chains 136 and 137 and the operating arm 145 of the switch 43 extends upwardly between both reaches of these chains. The switch 43 is normally in the closed position shown in Fig. 2 and in the normal operation of the mechanism the chains are not driven far enough in either direction to engage the bar 144 with the arm 145. However, should the mechanism fail to function properly and over run its normal amount of drive in either direction, the bar 144 would engage the arm 145 and open this switch, thereby stopping the motor.

The operation of the device as illustrated may be briefly described as follows. It will be assumed that the hand switch 42, which is the main switch to both the motor and lights, has been closed, that the motor and the gears on the post 52 are in operation, and that the exhibiting time period of the exhibits shown in Figs. 1 and 3 is substantially completed, it being understood that all the clutches are in the open position during the exhibiting periods.

*Opening light switch 33 and dropping curtains 36*

Figure 10:
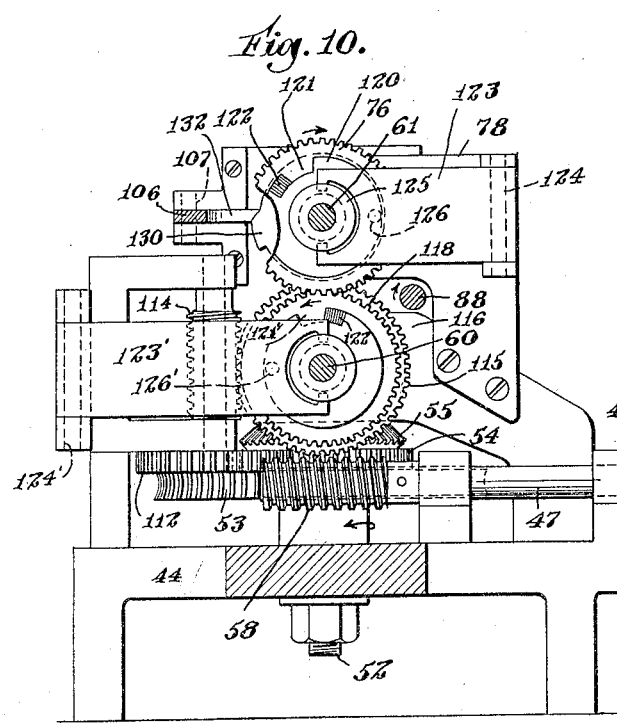
Fig. 10 is a sectional view taken on line 10—10 of Fig. 7.
Figure 11:
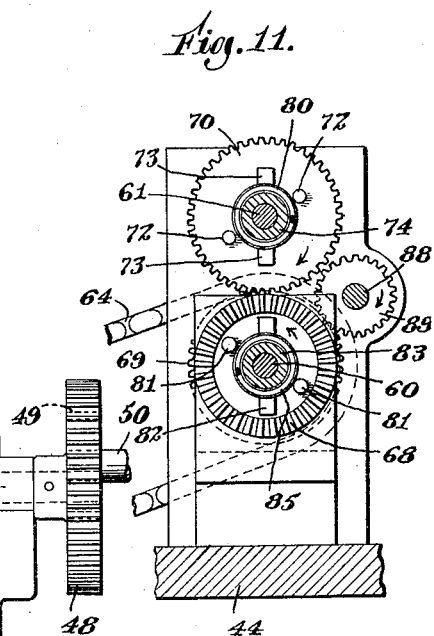
Fig. 11 is a sectional view taken on line 11—11 of Fig. 7.

By reference to Fig. 10 it will be seen that the cam 130 is just engaging the portion 132 of the lever 106 and continued rotation of the gear 76 causes this cam to force the lever 106 and the head 99 outwardly. Engaging of the pin 105 with the cam surface 103 thereupon withdraws the detent 95 and permits the bolt 92 to move forwardly and lock the gear 91 and sprocket 65 together. The sprocket 65 and shaft 37 are thereupon driven in a direction to drop the curtains 36. At the beginning of this movement the bar 142 moves backwardly and permits the light switch 33 to open, discontinuing the illumination at the exhibiting stations. The cam surface 130 is just long enough to permit the curtains to fully drop and thereafter the projection 132 drops off the cam and the head 99 engages with the hub portion 100. The end of bolt 92 thereupon wipes against the face cam 104 and is forced backwardly to the disengaged and latched position. The curtains 36 are now in the dropped position and the lights 30 are out.

Operation of belts 22 and 22' to change exhibits

Immediately following the curtain-dropping operation, the stud 126' drops into its recess 121', whereupon the clutch sleeve 83 moves to the left (Fig. 7) and clutches the gear 68 to the shaft 60. The shaft 60, sprockets 62 and shaft 26 are thereupon driven in a manner to move the belts 22 and 22' along to bring the next adjacent exhibits thereon to the exhibiting stations 12 and 14. The recess 121 is just sufficiently long to cause the proper amount of belt movement for this purpose and at the end thereof the cam face 122' engages the stud 126' and forces the plate 123' outwardly, which plate being connected to the clutch sleeve 83 withdraws the sleeve and disengages the projections 82 from the pins 81. The exhibits at the several stations have now been changed and are ready for the following exhibiting period.

Raising curtains 36 and closing light switch 33

By reference to Fig. 10 it will be seen that the recess 121 and stud 126 are so arranged relatively to the recess 121' and stud 126' that immediately following the withdrawal of the stud 126' by its cam 122' the stud 126 falls into its recess 121 and permits the clutch sleeve 74 to move to the left (Fig. 7). This operation clutches the shaft 61 to the gear 70 and causes the shaft 61, sprockets 65 and shaft 37 to rotate in the curtain-raising direction. The curtains 36 are thereupon raised and at the end of such movement the bar 142 engages the arm 141 and closes the light switch, it being understood that the recess 121 is just long enough to permit these operations before the cam 122 engages the stud 126 and disengages the clutch. The curtains are now raised and the new exhibits are illuminated and in proper exhibiting positions at their stations. It will be noted that the gear 76 now has a considerable distance to travel before it reaches the position shown in Fig. 10, at which position the curtains are again dropped, and the cycle of operations above defined repeated. The gear 76 rotates at a relatively slow rate and it is during this period that the exhibits are displayed. It will, of course, be understood that the duration of the exhibiting period can be as long or as short as desired merely by modifying the cooperating controlling parts, as will be understood.

Having thus described my invention, what I claim as new and desire to secure by Letters Patent is:

1. In an advertising device, the combination of an exhibiting station, a plurality of exhibits on an endless band adjacent thereto, a flexible curtain on a curtain roll, a motor, disengageable clutch connections for driving the band and roll from the motor, means automatically controlling the clutch connections to the band in a manner progressively disposing the exhibits at the station for a predetermined period of time, and means automatically controlling the clutch connections to the roll in a manner moving the curtain in opposite directions to cover the station during the changing of exhibits and to expose the exhibit thereat between the changing operations.

2. The device set forth in claim 1, in which the clutch connections to the band and roll are automatically controlled by cams continuously driven by the motor.

3. In an advertising device, the combination of an exhibiting station, a plurality of exhibits on an endless band adjacent thereto, a flexible curtain on a curtain roll, a shaft operatively connected to the band, a shaft operatively connected to the roll, a motor, disengageable clutch connections for driving the shafts from the motor, and means including cams driven from the motor automatically shifting the clutch connections to cause intermittent movement of the first-named shaft and band in a manner progressively disposing the exhibits at the station for a predetermined period of time and to cause reverse movements of the second-named shaft and roll in a manner moving the curtain in opposite directions to cover the station during the changing of exhibits and to expose the exhibit thereat between the changing operations.

4. The device set forth in claim 3, in which cams continuously driven from the motor are provided on both shafts and respectively and automatically function to control the rotation of the shafts on which they are mounted.

5. In an advertising device, the combination of an exhibiting station, a plurality of exhibits on an endless band adjacent thereto, a flexible curtain on a curtain roll, a motor, disengageable clutch connections for driving the band and roll from the motor, means automatically controlling the clutch connections in a manner progressively disposing the exhibits at the station for a predetermined period of time and moving the curtain in opposite directions to cover the station during the changing of exhibits and to expose the exhibit thereat between the changing operations, a safety switch to the motor, and means automatically opening the switch should the controlling means fail to function.

VICTOR B. KLEFBECK.